United States Patent [19]

Nguyen et al.

[11] Patent Number: 6,006,334

[45] Date of Patent: Dec. 21, 1999

[54] METHOD AND SYSTEM FOR AUTHENTICATION OVER A DISTRIBUTED SERVICE TO LIMIT PASSWORD COMPROMISE

[75] Inventors: Binh Q. Nguyen; Richard J. Redpath, both of Cary; Sandeep Kishan Singhal, Raleigh, all of N.C.

[73] Assignee: International Business Machines Corp., Armonk, N.Y.

[21] Appl. No.: 08/846,870

[22] Filed: May 1, 1997

[51] Int. Cl.[6] .............................. G06F 12/14; G06F 13/00; G06F 15/16; H04L 9/00

[52] U.S. Cl. .......................... 713/202; 713/201; 709/227; 709/229

[58] Field of Search ........................ 395/188.01, 187.01, 395/200.59, 200.57; 380/4; 713/202, 201; 709/229, 224

[56] References Cited

U.S. PATENT DOCUMENTS

| | | | |
|---|---|---|---|
| 5,553,239 | 9/1996 | Heath et al. | 395/187.01 |
| 5,689,638 | 11/1997 | Sadovsky | 395/188.01 |
| 5,708,780 | 1/1998 | Levergood et al. | 395/200.12 |
| 5,732,138 | 3/1998 | Noll et al. | 380/28 |
| 5,802,518 | 9/1998 | Karaev et al. | 707/9 |
| 5,835,724 | 11/1998 | Smith | 395/200.57 |
| 5,918,014 | 6/1999 | Robinson | 395/200.49 |

OTHER PUBLICATIONS

IBM Technical Disclosure Bulletin, vol. 27, NR 11, pp. 6754–6756, Apr. 1985.

*Primary Examiner*—Robert W. Beausoliel, Jr.
*Assistant Examiner*—Brian H. Shaw
*Attorney, Agent, or Firm*—A. Bruce Clay; Timothy J. O'Sullivan

[57] ABSTRACT

No more than one user at any one time is allowed to access a distributed service for each User ID and password. A user is allowed initial access to the distributed service with a password. The use of the distributed service is then restricted to the user upon entering the password plus a random factor created by the user. A user record is created as a unique recorded registration.

27 Claims, 7 Drawing Sheets

METHOD AND SYSTEM FOR AUTHENTICATION OVER A DISTRIBUTED SERVICE TO LIMIT PASSWORD COMPROMISE

FIELD OF THE INVENTION

The present invention relates in general to computer software, and in particular to a method and system for providing in a data processing system, i.e., a network interface, a user session access over a connection-less (non persistent connection) distributed service. More particularly, the present invention relates to a method and system by which Game Developers can connect users to each other to create/join a multi-user game in a scalable manner through a single authentication service.

BACKGROUND OF THE INVENTION

Over the Internet, a service provider may provide a World-Wide Web site that is physically partitioned among a plurality of servers. Many servers charge users a subscription fee to access these sites, and users then provide a user name and password. However, when the information sources are spread over different machines, there is no easy way to detect that two different users are accessing the service simultaneously with the same username and password. Authentication services need to be provided that operate efficiently in a distributed environment and not only admit valid users but also reject simultaneous duplicate users.

Prior art that exists today are the proprietary services that are provided by private and publicly available companies on the Internet such as TEN (Total Entertainment Network) and Blizzard Entertainment. Blizzard Entertainment provides an Internet lobby server called battle.net which is a free service to all users that have a CD of the Diablo game. It, therefore, authenticates users by detecting the presence of a file on the local machine. Diablo users can use this service to create a multi-user game over the Internet or locate and join an existing game. The service is free since users have already purchased the game as compensation. However, this process is easily compromised since the CD can be copied and multiple users can access the service without paying for the game. The overall goal is to provide a central Lobby in which users can open a game for others to see and join.

The Kerberos system, used by systems such as the Andrew File System (AFS) and MIT Project Athena, provides authentication services to access a set of distributed servers. The user presents credentials to a central server which provides access to any number of other servers. Again, no method is offered to detect duplicate users simultaneously accessing the system.

This disclosure provides a method to authenticate users and limit compromised passwords to provide a commercially viable service.

SUMMARY OF THE INVENTION

The present invention relates to a method and system for providing a commercial connectionless distributed service for authentication using a random factor to recognize compromised passwords.

In accordance with one aspect of the present invention, a method and system is provided for allowing no more than one user at any one time to access a distributed service. A user is allowed initial access to the distributed service with a password. The use of the distributed service is then restricted to the user upon entering the password plus a random factor created by the user. A user record is created as a unique recorded registration.

Another object of the present invention is to provide services in the presence of client-host failures and subsequent reconnection.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
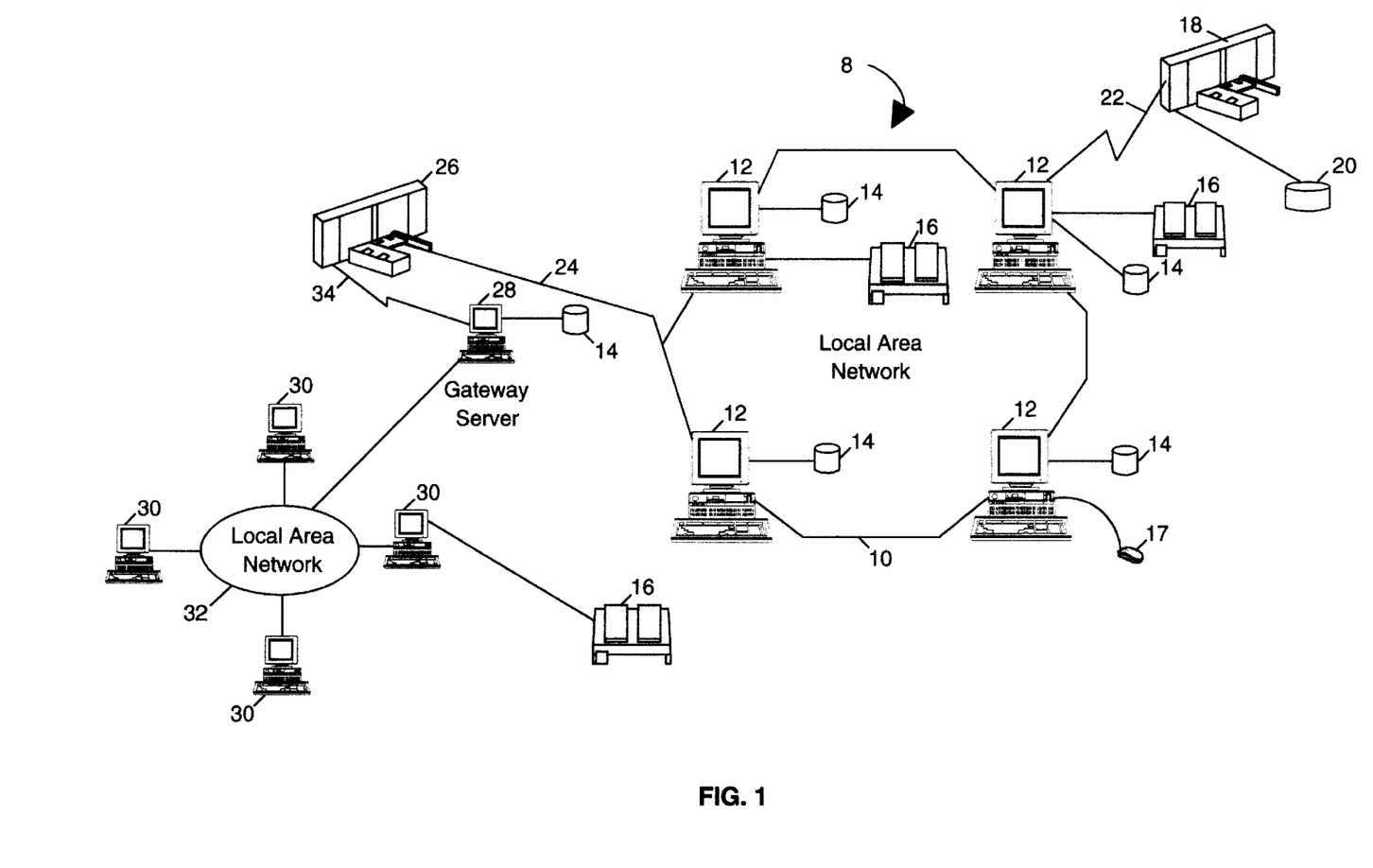
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

A common problem faced by network service providers is the issuing of access passwords for a monthly fee. A customer will purchase a password and use it to connect to the service. If this password becomes compromised, others could use the service for free. To reduce the monetary cost of possible compromise, passwords typically are only valid for one month. However, under the contract, only one user is supposed to use the password at any one time. A service provider does not care if the password is used by multiple parties, as long as only one party uses the password at any one time, since the charge was determined as such for the contract. At the end of the contract period (typically one month) the password is invalid and a new fee must be paid for continued use. If the original customer who has purchased the password has loaned it to others (or the password is compromised) multiple users can use the service simultaneously, therefore, infringing the rights of the contractor. This, obviously, creates a monetary loss for the service provider. The present invention as taught herein addresses and solves this problem.

Table 1 lists six operations to reasonably secure authentication, recognize compromised passwords, and reject those that are compromised. The operations are: Authenticate; Lobby Expiration; Create Visiting Server; Join Visiting Server; Rejoin Visiting Server; and Game Server Expiration.

TABLE 1

| Operation type | Parameter | Lobby Server (Process) |
|---|---|---|
| Authenticate | password + random | Check password if valid and reject otherwise. If the User Record for that password does not exist; User Record { Name/ID = cookie; Visiting Server = null; Expiration Time = set; Create time = current; } If User Record exists for that password then invoke Duplication Handler. |
| Lobby Expiration | | If User Record expiration due then remove the User Record |
| Create Visiting Server | password + random Visiting server | Check if cookie is valid and reject otherwise. If valid, set Visiting server field in User Record { Name/ID = cookie; Visiting Server = visiting server; Expiration Time = set Create Time = current; } |
| Join Visiting Server | password + random Visiting server | Check if cookie is valid otherwise reject. If valid then modify User Record { Name/ID = cookie; Visiting Server = visiting server; Expiration time = set; Create time = current; } |
| Rejoin Visiting Server | | The application knows the location of the visiting server and therefore can rejoin. |
| Visiting Server Expiration | | A user has dropped from the Game Server or quit the game, the Game Server contacts the Lobby Server to remove the User Record. |

| Definitions | |
|---|---|
| Authenticate | Gain access to the service, either the first time or after a failure |
| Lobby Expiration | Periodically the lobby removes a User Record or the Game Server can remove a User Record. |
| Join | First time user wants to join a game. |
| Rejoin | User's program still running but was disconnected to Game Server and wants to reconnect with the initial Authentication cookie |
| Visiting Server Expiration | A user has dropped from the Game Server or quit the game. |

Figure 2:
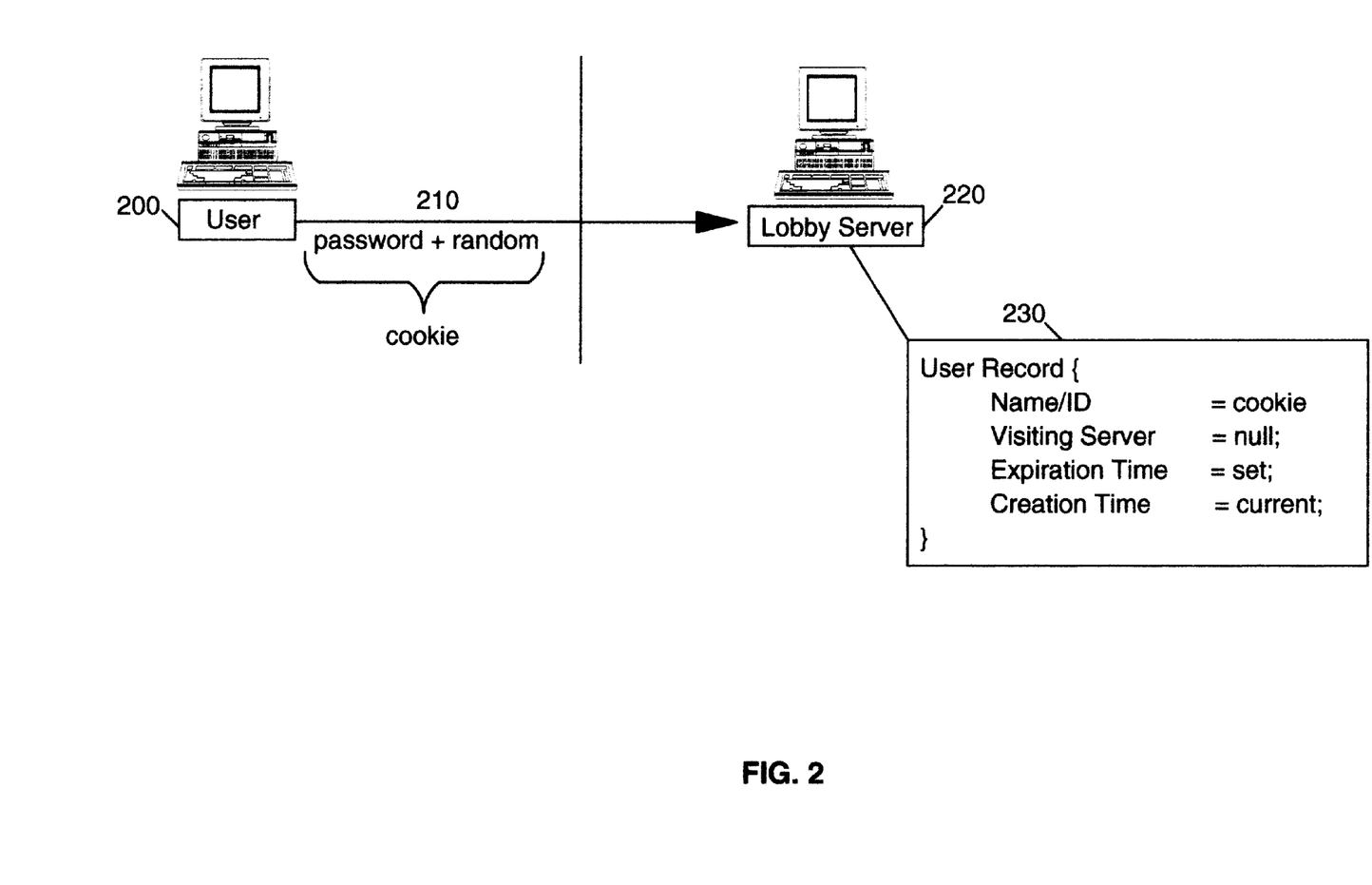
FIG. 2 illustrates the "Authenticate" operation by a user.
Figure 3:
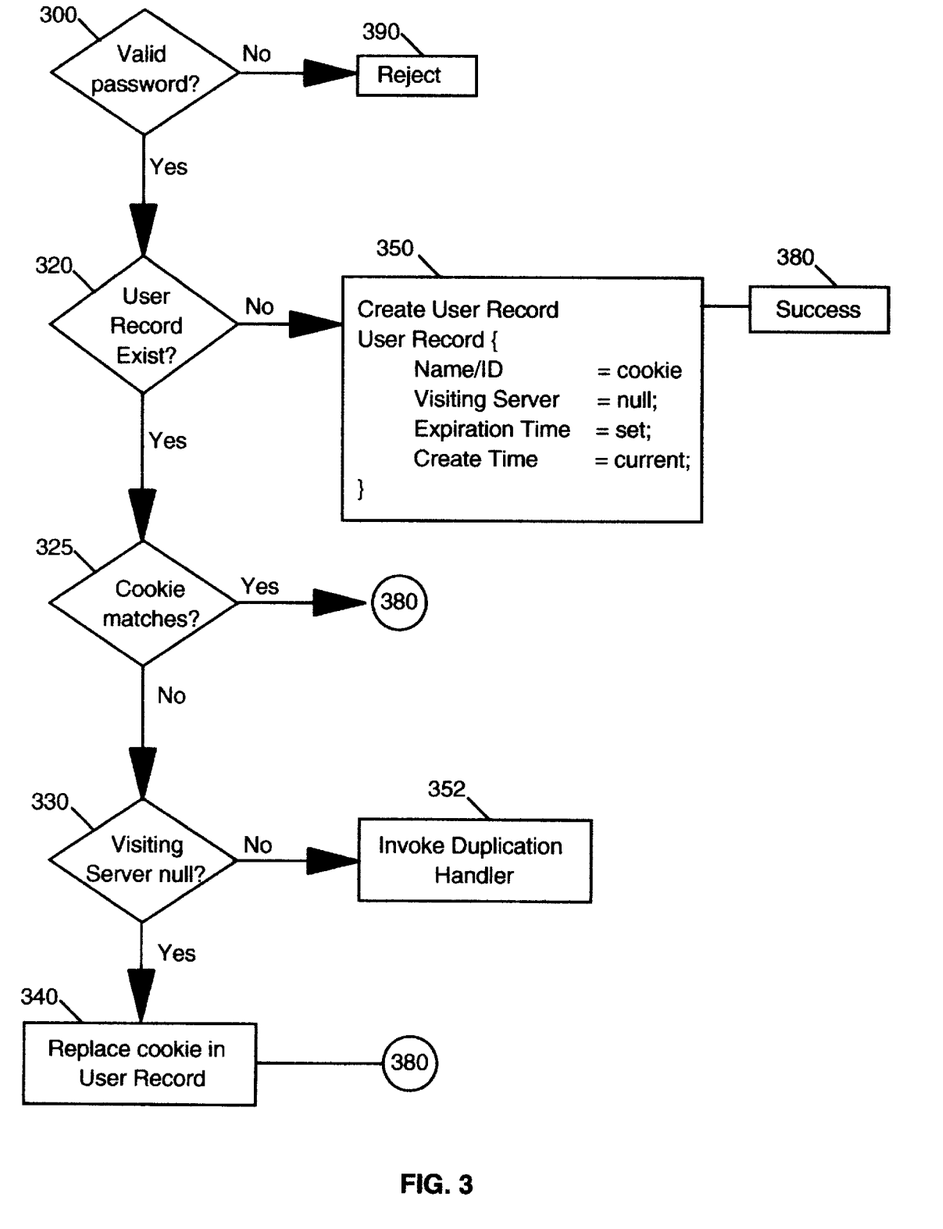
FIG. 3 illustrates a flowchart for the "Authenticate" operation.

Referring to FIG. 2, the Authenticate operation of Table 1 is illustrated. A User 200 Authenticates to a lobby server 220 with cookie 210 (as used herein, cookie means a password plus some additional random factor such as, for example, a random number, a time stamp, or an alpha-numeric string). The lobby server 220 will then check that the cookie contains a valid password (passwords have been purchased and are stored at the central database to designate valid users), as illustrated in the flowchart of FIG. 3. It is first determined at decision block 300 whether or not the password is valid. If not, the password is rejected at block 390. If the password is valid, it is determined at decision block 320 whether or not a user record exists for this user. If the response to decision block 320 is no, the lobby server 220 (see FIG. 2) will create a User Record for that password at block 350. Once the record is completed, the present invention returns success at 380. If the response to decision block 320 is yes, it is determined at block 325 whether or not the cookie provided by the user matches that in the User Record. If the response to decision block 325 is yes, then the process returns success at block 380. If the response to decision block 325 is no, it is determined at decision block 330 whether or not visiting server is null. If the response to decision block 330 is no, the present invention invokes a Duplication Handler at block 352. If the response to decision block 330 is yes, the cookie in the User Record is replaced at block 340 and success is indicated at 380.

Figure 4:
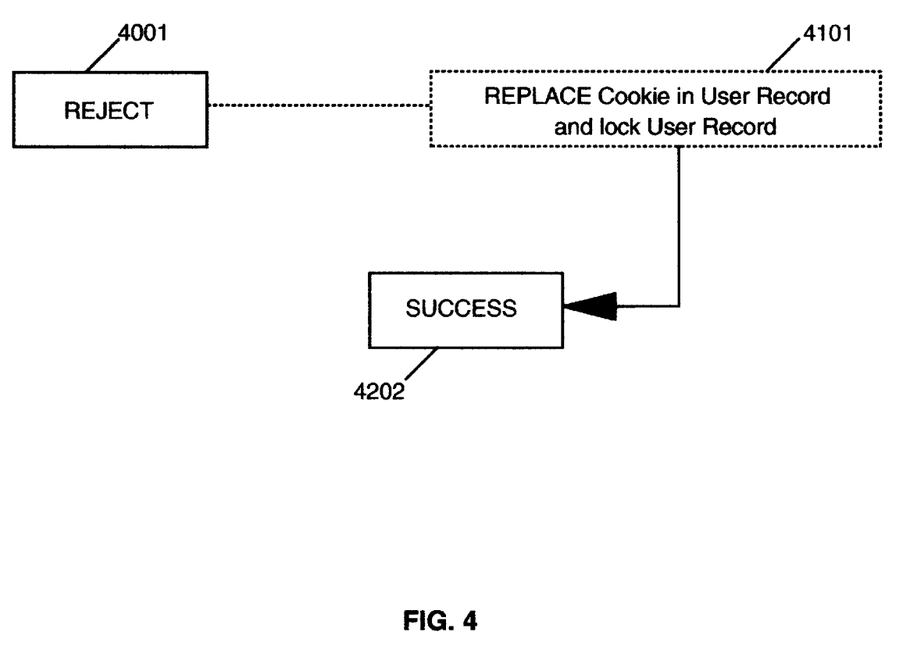
FIG. 4 illustrates a flowchart for various Duplication Handlers.

The Duplication Handler determines how to process a user when multiple instances of that user may be simultaneously active in the system (e.g., the User Record visiting server is not null). This situation occurs when the client has crashed and is re-connecting to the service or when the client's password has been compromised. Referring now to FIG. 4, in the preferred embodiment of the present invention, the new authentication is rejected in block 4001 until the User Record has expired. Alternatively, in block 4101, the cookie in the User Record is replaced with the new value and the Visiting Server field in the User Record is locked (thereby preventing the user from visiting other servers). The user is accepted in block 4202. These Duplication Handlers provide alternative tradeoffs between security (ensuring that only one instance of each user is in the system at a time) and convenience (whether a user can access the system immediately after the client machine crashed).

Referring to Table 1, the next process is Lobby expiration. The Lobby Server will reconcile the list of User Records and remove any records at the central database whose expiration time has arrived. Before performing this deletion, the Lobby Server may query a Visiting Server to determine whether the user is still active, and, if so, extend the User Record's expiration time.

Figure 5:
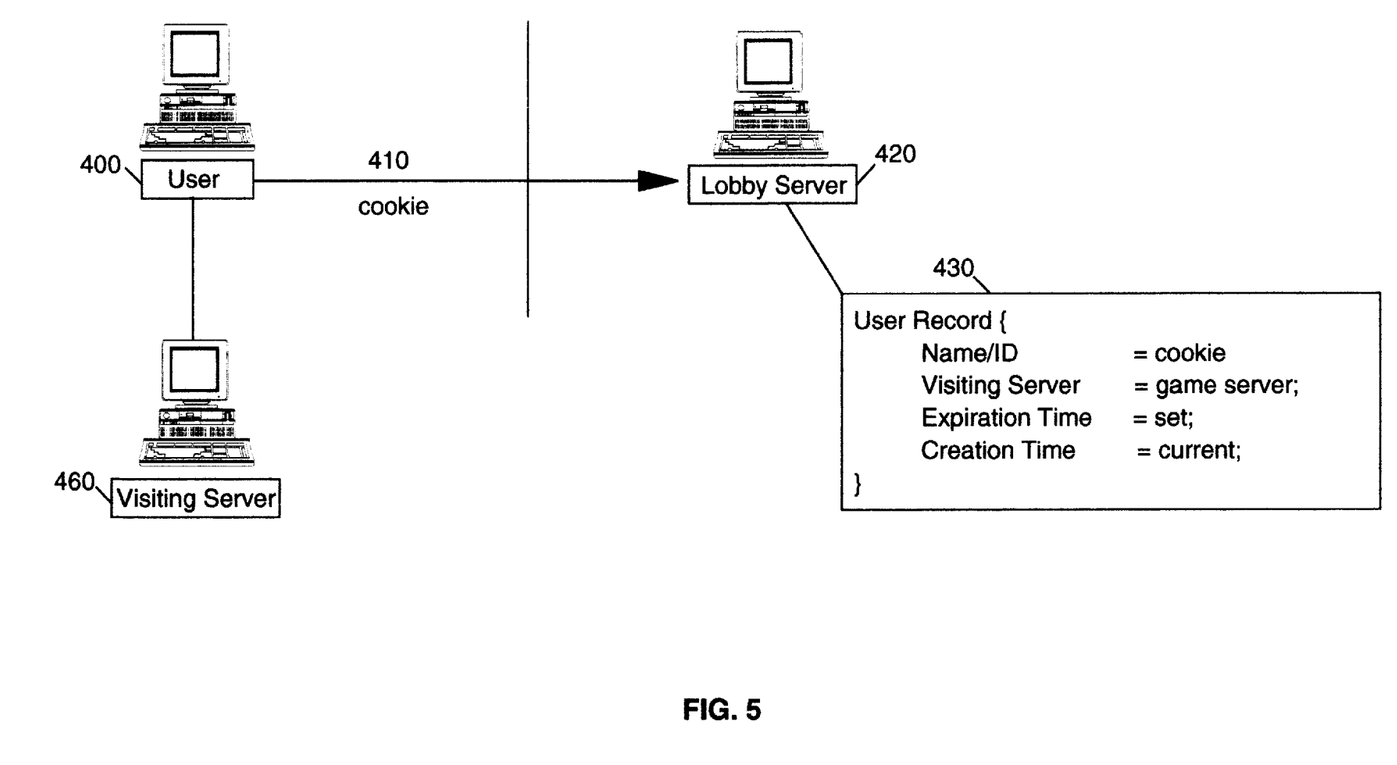
FIG. 5 illustrates the "Create Visiting Server" operation.
Figure 6:
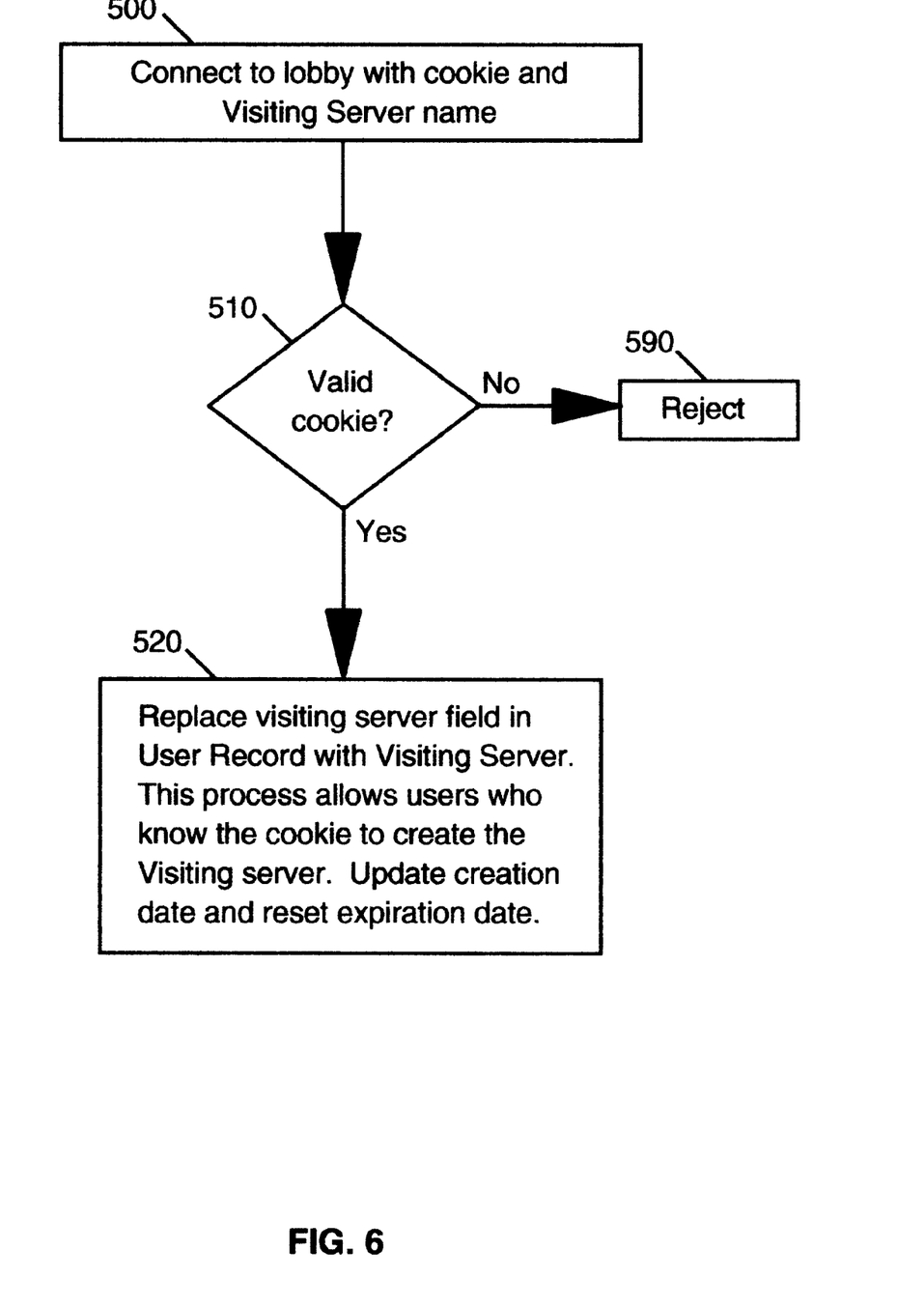
FIG. 6 illustrates a flowchart for the "Join Visiting Server" operation.

The next operation from Table 1 is Create Visiting Server. Referring to FIG. 5, a User 400 connects to the Lobby Server 420 with cookie 410. The Lobby Server 420 checks the cookie 410 in accordance with the flowchart illustrated in FIG. 6. It is determined at decision block 510 whether or not the cookie is valid. If the response to decision block 510 is no, the user is rejected at 590. If the response to decision block 510 is yes, the present invention replaces a visiting server field in the User Record with Visiting Server and updates a creation date at block 520. The present invention then resets an expiration date. This process allows users who know the cookie to create the visiting server. The user 400 then creates a Visiting Server 460, as shown in FIG. 5.

Figure 7:
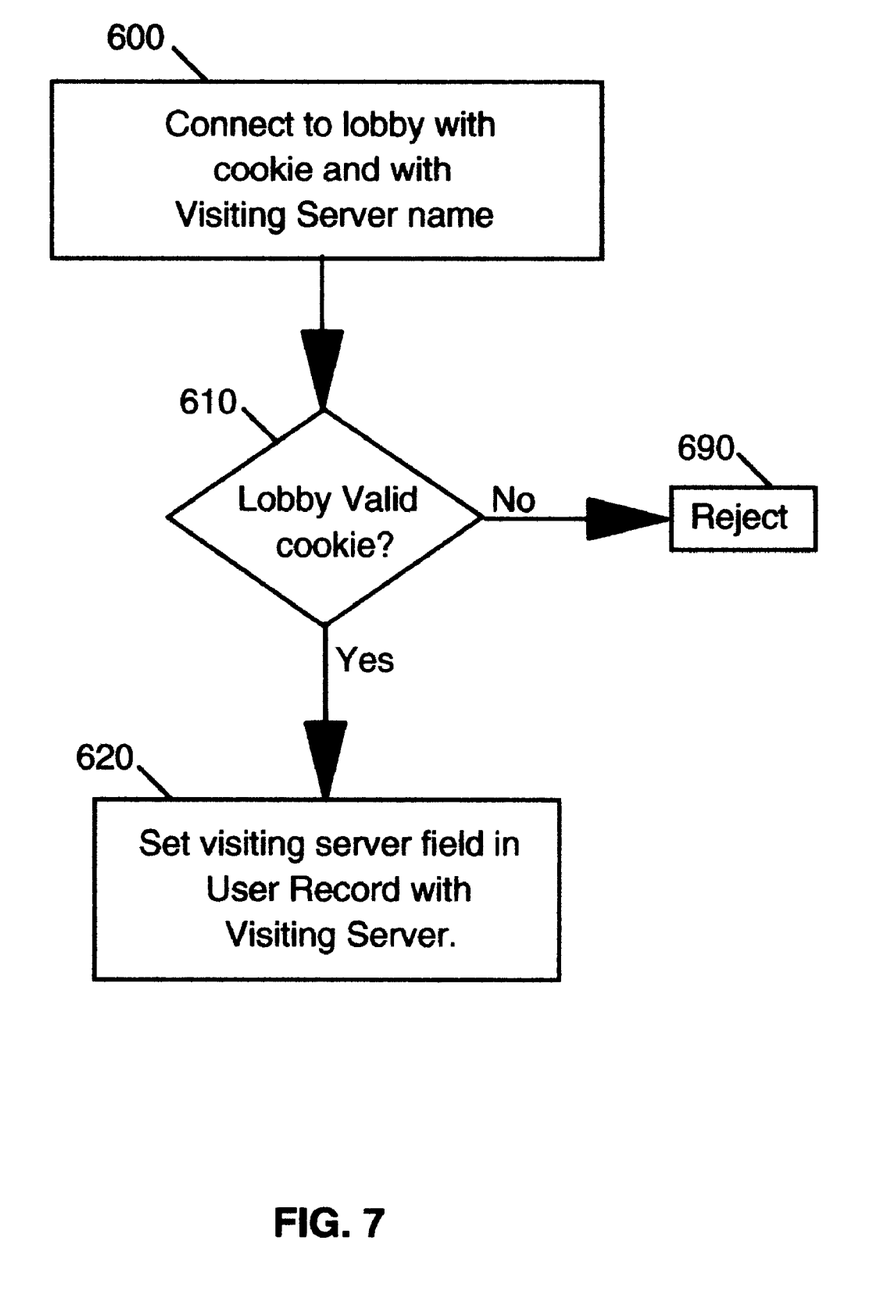
FIG. 7 illustrates a flow chart for the "Join Game" operation.

The next process per Table 1 is to join a game. Referring to FIG. 7, a user connects to the lobby at block 600 with the password plus a random factor and the Visiting server name. It is then determined at decision block 610 whether or not the lobby validates the cookie. If the response to decision block 610 is no, the cookie is rejected at 690. If the response to decision block 610 is yes, the visiting server is set in the User Record at block 620.

The next process per Table 1 is to rejoin a game. Rejoin is defined as a case in which a user program that is still running is disconnected from a Visiting Server and the user wants to reconnect to that Visiting Server. The policy for enabling this process is strictly up to the prerogative of the application since the location of the visiting server is known already, and it is not necessary to go to the lobby service to find the location.

The final operation per Table 1 is the Visiting Server expiration. When a user leaves a Visiting Server, the Visiting Server notifies the Lobby server which, in turn, clears the Visiting Server field of the corresponding User Record. Furthermore, a Visiting Server may instruct the Lobby server to extend the expiration time of a User Record.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of controlling access to a distributed service to one user at any one time with a same password, comprising the steps of:

allowing a user initial access to the distributed service with a user identification, a password and an additional initial random factor created by said user for a unique record registration in a user record;

creating a user record containing the user identification, the password and the initial random factor;

receiving a subsequent request to access the distributed service utilizing the user identification, the password and a subsequent random factor;

accessing the user record corresponding to the user identification of the subsequent request; and restricting use of the distributed service to said user during a subsequent request to access the distributed service with said user identification based on the accessed user identification, the password and said initial random factor contained in the user record.

2. The method of claim 1, further comprising:

using an expiration date to remove said user record.

3. The method of claim 2, further comprising:

allowing a visiting server to update said expiration date.

4. The method of claim 3, further comprising:

prior to removing said user record due to said expiration date, checking to see if said user is accessing said visiting server; and if said user is accessing said visiting server, updating said expiration date in order to void removal of said user record.

5. The method of claim 1, further comprising:

encrypting said initial random factor.

6. The method of claim 1, further comprising:

storing said user record at a central database to record registration with a visiting server using said password plus said initial random factor.

7. The method of claim 1, further comprising:

allowing a visiting server to remove said user record.

8. The method of claim 1, further comprising the step of rejecting the subsequent request if the random factor provided in the subsequent request does not match the random factor contained in the user record.

9. A method according to claim 1, further comprising the step of invoking a Duplication Handler when said subsequent request presents a subsequent random factor that does not match the initial random factor contained in the user record, wherein said Duplication Handler ensures that access to the distributed service in response to the subsequent request is limited to the services provided during the initial access.

10. A system for controlling access to a distributed service to one user at any one time with a same password, comprising:

means for allowing a user initial access to the distributed service with a user identification, a password and an additional initial random factor created by said user for a unique record registration in a user record;

means for creating a user record containing the user identification, the password and the initial random factor;

means for receiving a subsequent request to access the distributed service utilizing the user identification, the password and a subsequent random factor;

means for accessing the user record corresponding to the user identification of the subsequent request; and means for restricting use of the distributed service to said user during a subsequent request to access the distributed service with said user identification based on the accessed user identification, the password and said initial random factor contained in the user record.

11. The system of claim 10, further comprising:

means for using an expiration date to remove said user record.

12. The system of claim 11, further comprising:

means for allowing a visiting server to update said expiration date.

13. The system of claim 12, further comprising:

prior to removing said user record due to said expiration date, means for checking to see if said user is accessing said visiting server; and if said user is accessing said visiting server, means for updating said expiration date in order to void removal of said user record.

14. The system of claim 10, further comprising:

means for encrypting said initial random factor.

15. The system of claim 10, further comprising:

means for storing said user record at a central database to record registration with a visiting server using said password plus said initial random factor.

16. The system of claim 10, further comprising:

means for allowing a visiting server to remove said user record.

17. The system of claim 10, further comprising means for rejecting the subsequent request if the random factor provided in the subsequent request does not match the random factor contained in the user record.

18. A system according to claim 10, further comprising means for invoking a Duplication Handler when said subsequent request presents a subsequent random factor that does not match the initial random factor contained in the user record, wherein said Duplication Handler ensures that access to the distributed service in response to the subsequent request is limited to the services provided during the initial access.

19. A computer program product recorded on computer readable medium for controlling access to a distributed service to one user at any one time with a same password, comprising:

computer readable means for allowing a user initial access to the distributed service with a user identification a password and an additional initial random factor created by said user for a unique record registration in a user record;

computer readable means for creating a user record containing the user identification, the password and the initial random factor;

computer readable means for receiving a subsequent request to access the distributed service utilizing the user identification, the password and a subsequent random factor;

computer readable means for accessing the user record corresponding to the user identification of the subsequent request; and computer readable means for restricting use of the distributed service to said user during a subsequent request to access the distributed service with said user identification based on the accessed user identification, the password and said initial random factor contained in the user record.

20. The program product of claim 19, further comprising:

computer readable means for using an expiration date to remove said user record.

21. The program product of claim 20, further comprising:

computer readable means for allowing a visiting server to update said expiration date.

22. The program product of claim 21, further comprising:

prior to removing said user record due to said expiration date, computer readable means for checking to see if said user is accessing said visiting server; and if said user is accessing said visiting server, computer readable means for updating said expiration date in order to void removal of said user record.

23. The program product of claim 19, further comprising:

computer readable means for encrypting said initial random factor.

24. The program product of claim 19, further comprising:

computer readable means for storing said user record at a central database to record registration with a visiting server using said password plus said initial random factor.

25. The program product of claim 19, further comprising:

computer readable means for allowing a visiting server to remove said user record.

26. The program product of claim 19, further comprising computer readable means for rejecting the subsequent request if the random factor provided in the subsequent request does not match the random factor contained in the user record.

27. A program product according to claim 19, further comprising computer readable means for invoking a Duplication Handler when said subsequent request presents a subsequent random factor that does not match the initial random factor contained in the user record, wherein said Duplication Handler ensures that access to the distributed service in response to the subsequent request is limited to the services provided during the initial access.

* * * * *